(No Model.) 2 Sheets—Sheet 1.
H. C. PLATT.
CAMERA SHUTTER.
No. 484,456. Patented Oct. 18, 1892.
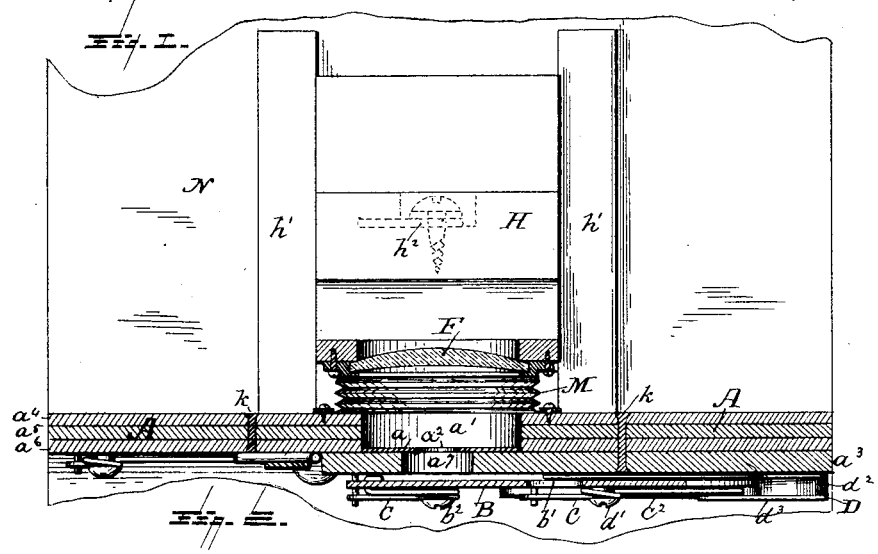
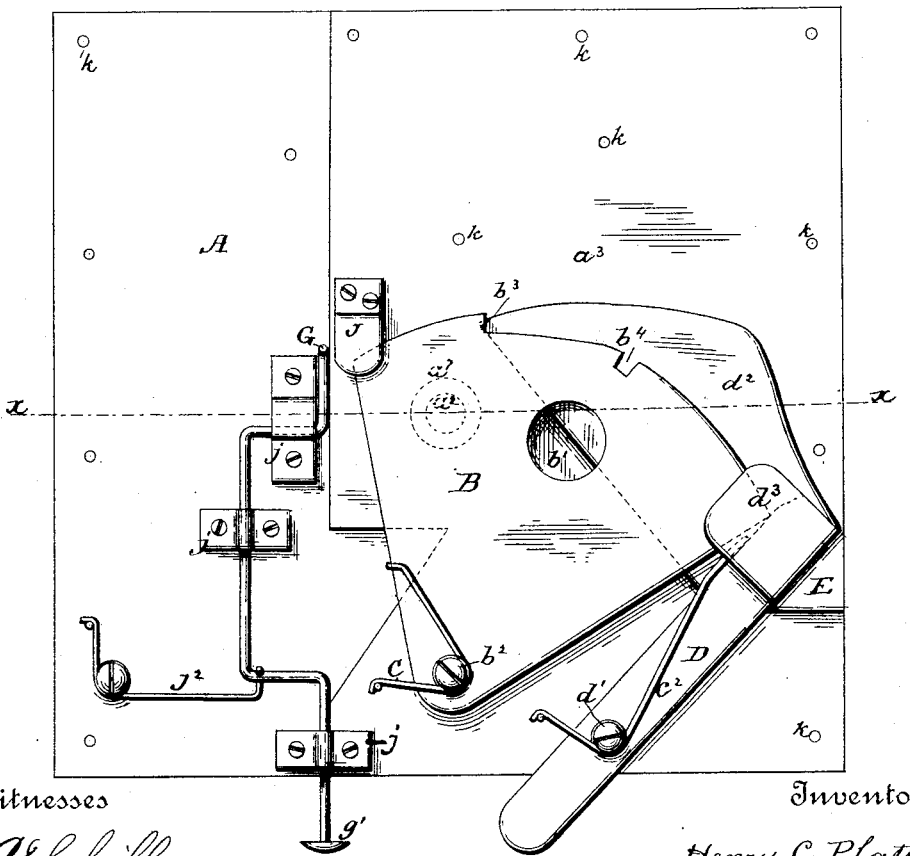
Witnesses
C. C. Schiller
S. J. Masson
Inventor
Henry C. Platt
By his Attorney
E. E. Masson (No Model.) 2 Sheets—Sheet 2.
H. C. PLATT.
CAMERA SHUTTER.
No. 484,456. Patented Oct. 18, 1892.
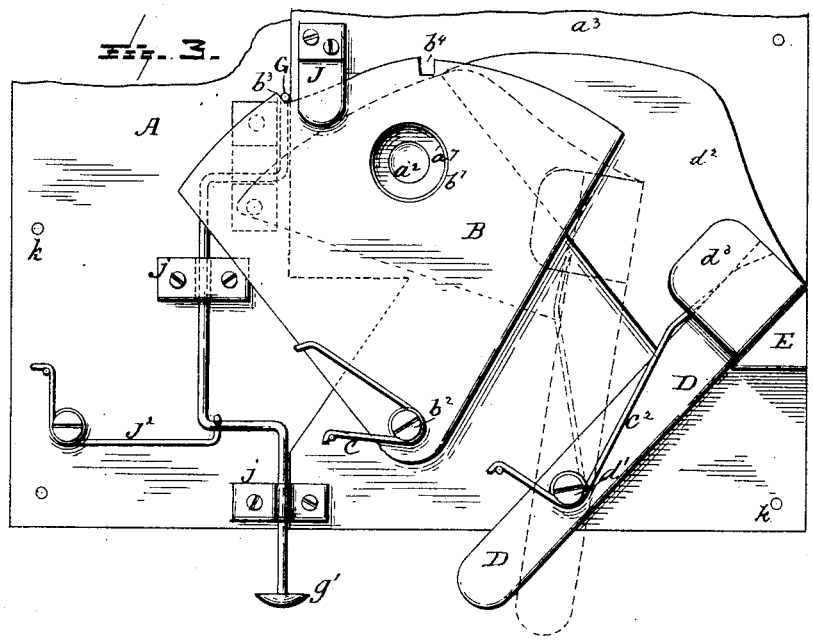
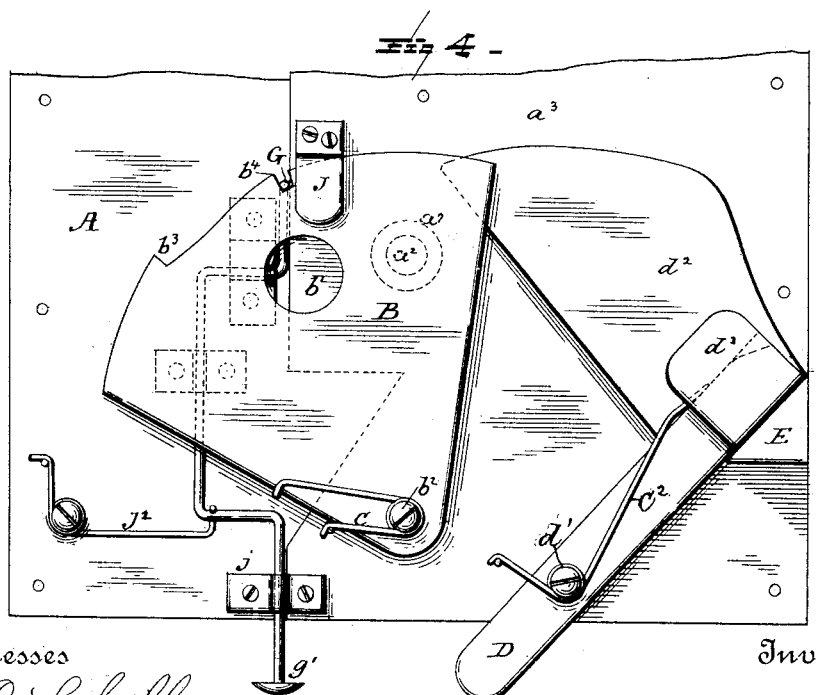
Witnesses
C. O. Schiller
I. J. Masson
Inventor
Henry C. Platt
By his Attorney
E. E. Masson

UNITED STATES PATENT OFFICE.

HENRY C. PLATT, OF NANTUCKET, MASSACHUSETTS.

CAMERA-SHUTTER.

SPECIFICATION forming part of Letters Patent No. 484,456, dated October 18, 1892.

Application filed May 4, 1891. Serial No. 391,503. (No model.)

*To all whom it may concern:*

Be it known that I, HENRY C. PLATT, a citizen of the United States, residing at Nantucket, in the county of Nantucket, State of Massachusetts, have invented certain new and useful Improvements in Cameras, of which the following is a specification, reference being had therein to the accompanying drawings.

This invention relates, mainly, to cameras in which the operation is substantially instantaneous; and its object is to provide cameras of that class with peculiar means to permit them to be used, also, for long exposures without requiring them to be capped or closed by hand while being set.

The invention consists mainly, in the peculiar construction of the shutter and shutter board, as hereinafter described in connection with the accompanying drawings, in which—

Figure 1 is a horizontal section of a portion of a camera constructed in accordance with my invention, said section being taken on line $x$ $x$ of Fig. 2 and passing through the center of the light-receiving hole. Fig. 2 is a front view of the face-board and shutter-board with the shutter and its setting-lever in normal position. Fig. 3 is a front view of the shutter-board and shutter, the latter being set for making time exposures. Fig. 4 is a front view of the shutter-board and shutter, the latter being set for making instantaneous exposures.

In the drawings is shown a portion only of the case or box in which is to be placed as usual a frame and springs arranged to hold the ground glass and holder containing a sensitive-plate in proper place to receive an impression, and in said box is placed a stationary vertical shutter-board A, having a suitable-sized hole $a'$ in it, through which light passes to the lens F, and in said hole is located a stop or diaphragm $a$ that is either permanent or changeable and has a central perforation $a^2$ therein. A face-board $a^3$ is riveted on the front of the shutter-board A and has therein a hole $a^7$, coinciding centrally with the hole $a^2$ in the diaphragm.

To prevent the light from reaching the lens F or to control its admission thereto, a triangular segment-shaped shutter B is used. It is pivoted at its lower end at $b^2$ to the front of the face-board $a^3$ and has nearly centrally therein, but nearer its curved periphery, a hole $b'$ through it, in such a position that when the shutter is revolved the hole $b'$ passes directly in front of the holes $a^2$ and $a^7$ and admits light to the lens F.

To retain the shutter in any desired position, its curved top edge has two notches $b^3$ $b^4$ therein. The notch $b^4$ is rectangular; but the notch $b^3$ is beveled on one side, forming a shoulder, with which a spring-catch G is made to engage. Said catch consists of a suitably-bent wire guided by staples $j$, secured to the shutter-board. Its upper end is bent horizontally or of hooked form to engage with the notches $b^3$ or $b^4$, its middle portion has a spring $j^2$ pressing down upon it, and its lower end is provided with a head $g'$, passing through the bottom of the camera. By giving suitable bends to the wire of the catch G its head can be made to project through the side or the top of the camera.

To promptly rotate the shutter B across the front of the face-board $a^3$, a spring C has one or two coils around the pivot-screw $b^2$, and one of its ends bears against a stationary pin, while the other end bears against one edge of the shutter, and said spring causes the opposite edge of the shutter to normally rest against the setting-lever D, and when in said normal position, as in Fig. 2, all light is kept from passing through the lens. The notch $b^3$ in the edge of the shutter is of such form that when the spring-catch G drops into it the shutter B cannot return to its normal position until the head $g'$ is pressed. In this position the hole $b'$ in the shutter, the hole $a^7$ in the face-board, and the hole $a^2$ in the diaphragm coincide, and light is admitted through the lens F for the purpose of exposing the sensitized plate or for seeing the focus on a ground glass or other focusing-screen. In this position the shutter B is set for making time exposures. The exposure continues from the instant the setting-lever is released until the head $g'$ is pressed, the duration being regulated by the will of the operator. The notch $b^3$ being inclined on the side opposite to that from which the catch G dropped into, offers no resistance to a further movement of the shutter B by the setting-lever D when it is desired to set the shutter for snap or instantaneous exposures, as shown in Fig. 4. When the second notch $b^4$ reaches the catch G, the latter drops into it, and said notch, having both sides straight, prevents the shutter being moved either way. The lever D on being released returns to its normal position against the check E. When the shutter is in this position, the holes $a^2$ and $a^7$ are covered by said shutter and all light is excluded from the lens. To make the exposure, pressure on the head $g'$ raises the catch G and releases the shutter, which is instantly thrown over to its normal position, and while it revolves it causes the hole $b'$ in the shutter to coincide for an instant with the holes $a^2$ and $a^7$, thus admitting light through the lens F to the sensitized plate while they are coincident.

The setting-lever D is pivoted to the face-board $a^3$ at $d'$ and is provided on one side of its upper end with a cut-off $d^2$, consisting of a thin plate of such size as to cover the holes $a^2$ and $a^7$, while the hole $b'$ in the shutter is passing them during the operation of setting the shutter, and in this way keeping the light from entering the lens; but when the shutter B has been set it is thrown back to its normal position by a spring $C^2$, that has one or more coils around the pivot-pin $d'$ and one of its ends bearing against a stationary pin, while the other end bears against the edge of the lever D. The cut-off $d^2$ of said lever is long enough for a portion of it to remain always behind the shutter B and act as a guide for said shutter. A front wing $d^3$ on the lever D serves, in connection with the cut-off $d^2$, to keep the shutter in proper place against the lever while being set. To guide the opposite end of the shutter while being moved, a clip J is secured to the face-board $a^3$ and prevents the shutter from springing away from said face-board.

To set the shutter, the lower end of the lever D where it projects through the bottom of the camera is pulled by the operator. This causes the upper end to push against the edge of the shutter and revolve it on its pivot $b^2$ until the catch G enters into engagement with either the notch $b^3$ or the notch $b^4$, as before described.

To prevent the shutter-board A from warping or springing, and thus to permit its face to remain perfectly flat and true, said shutter-board is constructed of three thin boards $a^4$ $a^5$ $a^6$, having the direction of their grain alternating, and said boards are fastened together by rivets $k$ instead of being glued or cemented together. The lens F of the camera is mounted on a sliding carrier H and is adapted to be moved behind the hole $a'$ in the shutter-board at a more or less distance from said board. It is connected with the shutter-board A by a flexible tube or bellows M to prevent the light from entering into the camera except by passing through the lens. The carrier H is arranged to be moved back and forth in the guides $h'$, secured to the frame of the camera.

Having now fully described my invention, I claim—

1. The combination of a camera-frame and shutter-board, a spring-actuated shutter pivoted to said board and having notches $b^3 b^4$ in its periphery, the notch $b^3$ being beveled on one side, and a hole $b'$, adjacent to its curved periphery, and a spring-catch passing through the bottom of the camera and adapted to engage with the notch $b^3$ for time exposure and with the notch $b^4$ for instantaneous exposure with the lever D, carrying a cut-off plate and having its pivot independent of the shutter-pivot, substantially as described.

2. The combination of a camera shutter-board and a spring-actuated shutter pivoted thereto and having the hole $b'$ therein with the pivoted lever D, having the cut-off plate $d^2$, adapted to close the hole $b'$ and guide one side of the shutter, and the front wing $d^3$, adapted to guide the other side of the shutter, substantially as described.

3. The combination of a camera shutter-board, a triangular shutter pivoted thereto, a spring to actuate it in one direction, and a pivoted lever D to actuate it in the opposite direction, said lever having guide-plates to embrace one corner of the shutter, with the clip J, secured to the shutter-board to guide, also, the shutter, substantially as described.

In testimony whereof I affix my signature in presence of two witnesses.

HENRY C. PLATT.

Witnesses:
J. B. PLATT,
LAURISTON BUNKER.